United States Patent [19]

Hintermeister

[11] 4,043,913

[45] Aug. 23, 1977

[54] DEVICE FOR STERILIZING SWIMMING-POOL WATER

[76] Inventor: Edouard Hintermeister, 15 Notelaarweg, Keerbergen, Belgium

[21] Appl. No.: 667,997

[22] Filed: Mar. 18, 1976

[30] Foreign Application Priority Data

Mar. 18, 1975 Belgium .................. 826801

[51] Int. Cl.² ........................... E04H 3/16
[52] U.S. Cl. .................. 210/169; 210/192; 210/220; 261/125
[58] Field of Search ............. 210/169, 192, 44, 63, 210/50, 192, 198, 220; 250/532; 261/125

[56] References Cited

U.S. PATENT DOCUMENTS

| | | | |
|---|---|---|---|
| 1,594,948 | 8/1926 | Hartman | 210/192 X |
| 1,865,433 | 7/1932 | Daily | 210/192 X |
| 2,050,771 | 8/1956 | Wait | 210/192 |
| 3,421,999 | 1/1969 | Corwin | 210/192 |
| 3,540,592 | 11/1970 | Derreumaux | 210/169 |
| 3,775,314 | 11/1973 | Beitzel et al. | 210/63 X |
| 3,805,481 | 4/1974 | Armstrong | 210/63 X |
| 3,855,124 | 12/1974 | Lapidot | 210/44 |
| 3,904,521 | 9/1975 | Stopka | 210/192 |
| 3,945,918 | 3/1976 | Kirk | 210/44 |

Primary Examiner—Theodore A. Granger
Attorney, Agent, or Firm—Weiser, Stapler & Spivak

[57] ABSTRACT

There is described a device for sterilizing swimming-pool water, particularly of small-volume pools, said device being provided in the water regenerating flow circuit and comprising an ozonizer, in which the ozonizer is so arranged as to supply the ozone directly either into the water flowing through the regeneration circuit, or into the water inside a water-ozone contacting chamber without venting the ozone to the atmosphere.

5 Claims, 3 Drawing Figures

DEVICE FOR STERILIZING SWIMMING-POOL WATER

This invention has for object a device for sterilizing swimming-pool water, particularly small-volume pools, said device being provided in the water regenerating flow circuit and it comprises an ozonizer.

Devices are already known for sterilizing swimming-pool water by means of ozone. Said devices are designed for pools with a large water volume and they have the drawback of being too complex, too expensive and too cumbersome to be used for sterilizing the water in home swimming-pools with a small water volume. Indeed such devices comprise an air dryer for producing ozone, one or a plurality of air coolers, a high-output ozonizer, a mixer for diffusing ozone into the water by means of an injector with injecting pump to increase the pressure, a water tank and a contacting column for the water-ozone mixture, flow-meters, pressure regulators, safety devices, etc... Said known devices have also for drawback that they generate more ozone than it is possible to mix with the water, which requires venting the excess ozone to the atmosphere, said ozone being dangerous as a pure gas, which thus requires the presence in said known devices of an ozone tank with automatic valve and activated-carbon filter through which passes the ozone to be vented to the atmosphere as oxygen and carbon dioxide.

The invention has for object to obviate the above drawbacks and to provide for swimming-pools with such a volume that it is substantially impossible economically to use for sterilizing the water, nothing but chlorine with the well-known accompanying drawbacks, a very simple ozone-sterilizing device, which is less costly to use than sterilizing with chlorine, which can easily either be combined with an existing water-regenerating circuit, or integrated to such a regenerating circuit when installing a new swimming-pool, said device having the advantage of producing substantially without maintenance or control with a very low cost and without discharging ozone or danger of leaking ozone to the atmosphere, a reduced amount of ozone which is completely used for sterilizing the water in the regenerating circuit.

For this purpose according to the invention, the ozonizer is so arranged as to supply the ozone directly either into the water flowing through the regeneration circuit, or into the water inside a water-ozone contacting chamber without venting the ozone to the atmosphere.

In an embodiment of the invention, the ozonizer is so arranged that all of the ozone it does generate be supplied to the water in the regenerating circuit, without an intermediate ozone-storing step.

In an advantageous embodiment of the invention, the ozonizer is mounted inside the water-ozone contacting chamber which is sealed-off and which comprises an inlet and an outlet for the water to be sterilized, means being provided in said chamber for insuring the water-ozone contacting.

In a particularly advantageous embodiment of the invention, the regenerating circuit comprises a pump such as a side-channel pump, which forces the water through a filter, the ozonizer being arranged on the water pipe upstream of the pump sucking the ozone and forcing same through a pipe separate from the water pipe towards said filter, said filter being comprised of a sealed enclosure comprising from bottom to top a chamber inside which opens a water-outlet pipe, a layer of filtering material, a constant-level chamber inside which is performed the second water-ozone mixing, the first mixing occuring inside the duct upstream of the pump that the ozonizer supplies, a diffuser being provided below the water level inside the constant-level chamber, said diffuser being mounted at the end of the duct feeding the ozone to the filter, the water-inlet pipe to the filter opening inside the constant-level chamber above the water level.

Other details and features of the invention will stand out from the description given below by way of non limitative example and with reference to the accompanying drawings, in which.

In the various figures, the same reference numerals pertain to similar or identical elements.

Figure 1:
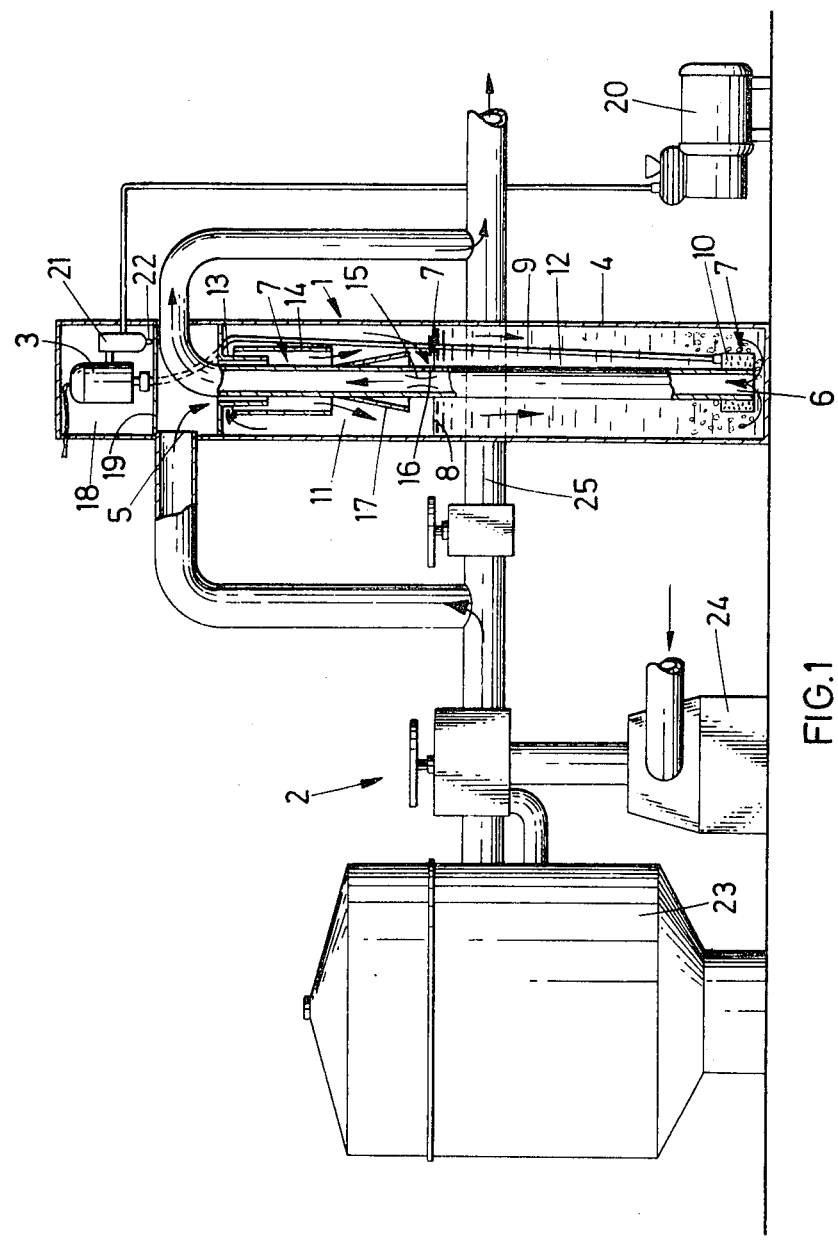
FIG. 1 is a diagrammatic view of a device for sterilizing water by means of ozone according to the invention, which is to be adapted to an existing water-regenerating circuit.
Figure 2:
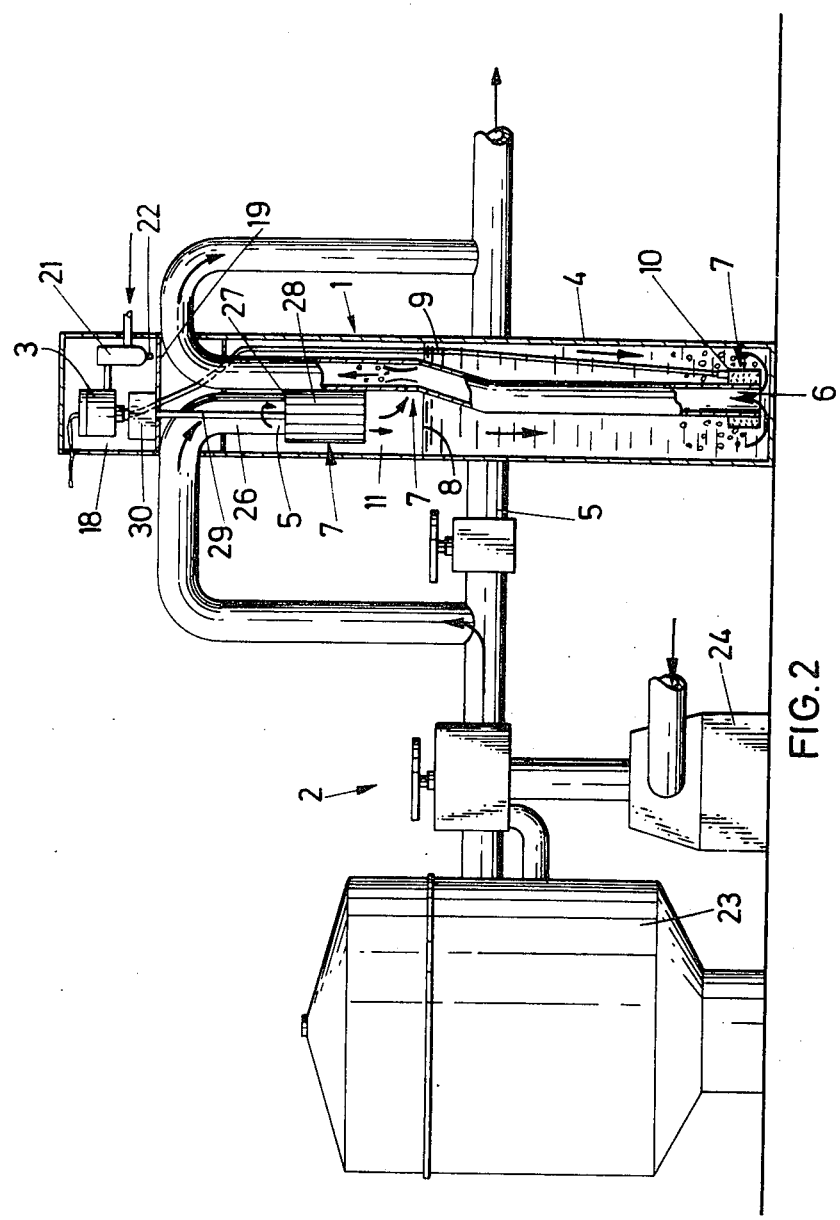
FIG. 2 is a diagrammatic view similar to FIG. 1 showing another embodiment of the device shown in FIG. 1.
Figure 3:
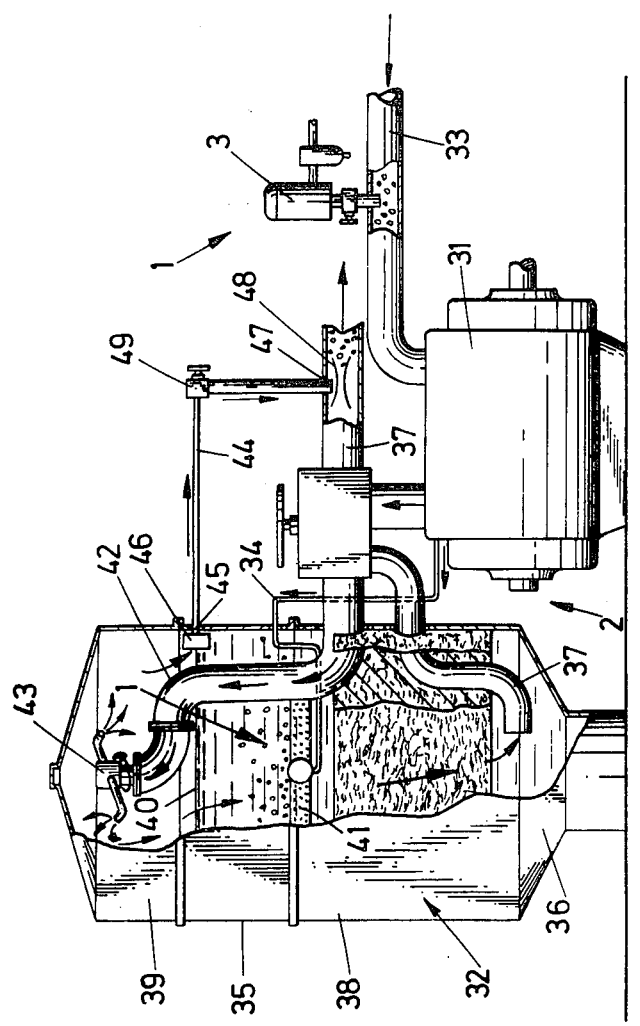
FIG. 3 is a diagrammatic view of a device for sterilizing water by means of ozone which is integrated to a water-regenerating circuit for a new swimming-pool.

The device 1 according to the invention as shown in the drawings is to be arranged in the regenerating circuit 2 of a swimming-pool with a small volume of water to sterilize said water with the ozone supplied by an ozonizer 3 which is so arranged that said ozone be supplied as shown in FIG. 3 directly to that water flowing through the regeneration circuit 2 or as shown in FIGS. 1 and 2, to the water of water-ozone contacting chamber 4 without venting ozone to the atmosphere. The ozonizer 3 of device 1 is comprised of electrode-dielectric units which are arranged in a circle about the outlet of an air pipe so as to reduce the air throughput rate. The electric supply for ozonizer 3 is insured either with the mains current brought to 5000–6000 volts by means of a transformer, or with a primary current of 12 volts DC which is modulated to a frequency of 100 to 400 cycles/second by means of a mechanical or electronic switch and brought to 10–12 kilovolts. Said ozonizer 3 is so arranged that all of the generated ozone be supplied to the water in the regenerating circuit 2 without an intermediate ozone-storing step, which allows to avoid the use, on the one hand, of an ozone tank with the accompanying safety system for venting the excess ozone and on the other hand, of an activated-carbon filter to convert the excess ozone into oxygen and carbon dioxide. In the device shown in FIGS. 1 and 2, the ozonizer 3 is mounted inside the water-ozone contacting chamber 4 which is sealed-off and which comprises an inlet 5 and an outlet 6 for the water to be sterilized as well as means 7 for insuring the water-ozone contacting. The chamber 4 is of the constant level type and the ozonizer 3 is arranged above the water level 8 and so as to supply the ozone through a pipe 9 and through a diffuser 10 dipping into the water at the contacting chamber bottom, the water inlet 5 being located above the water level 8 in such a way that the water to be sterilized runs into that portion 11 of the tank which lies above the water level and which contains gas escaping from the water, the water outlet 6 being located below the water level adjacent the bottom of contacting chamber 4, and being surrounded by the diffuser 10 in such a way that the water flowing through chamber 4 will have a maximum contact with the ozone supplied by the duffuser 10. To increase the ozone-water contacting over the whole height of chamber 4, said means 7 are also provided in that chamber portion 11 located above water level 8. Said means 7 are notably comprised (FIG. 1) of a water-outlet pipe 12 which is so arranged in chamber 4 as to extend above water level 8 to the level of water inlet 5. Said pipe 12 is surrounded over that length thereof lying above water level, by two coxial pipe sections 13 and 14 which are staggered relative to one another, section 13 being connected to the walls of chamber 4 below water inlet 5, in such a way that the water to be sterilized flows between pipe 12 and pipe 13, pipe 14 surrounding pipe 13 and being staggered relative thereto in such a way that the flow of water to be sterilized between pipes 12 and 13 generates an underpressure between pipes 13 and 14 so that the gas present in portion 11 of chamber 4 be forced between pipes 13 and 14 be contacted with the water to be sterilized in such a way that all of said water be contacted with the ozone over substantially the whole height of the chamber 4. Said means 7 also comprise a system for allowing inside pipe 12, a last gas-water mixing, said system being comprised of a Venturi device 15 that generates a turbulence inside pipe 12 which sucks gas through an opening 16 provided in said pipe 12 at water level 8, said gas originating from portion 11 of chamber 4, a baffle 17 being provided on pipe 12 above opening 16 and being so arranged on the one hand as to generate turbulences in the water to be sterilized flowing through pipes 12, 13 and 14 to insure the water-gas mixing, and on the other hand, to avoid that the water running on pipe 12 enters said pipe 12 through opening 16. The ozonizer 3 is arranged at the top of chamber 4, inside an enclosure 18 isolated from chamber 4 by a tight wall 19 through which passes the pipe 9 connecting ozonizer 3 to diffuser 10. Said ozonizer 3 is supplied in the device as shown in FIG. 1, by a compressor 20, the air before entering ozonizer 3, flowing over an air filter 21 provided with a condensate water drain 22. Chamber 4 is cut-in in the water-regenerating circuit at the outlet from filter 23 through which flows the swimming-pool water by means of a pump 24, the device further comprising a by-pass 25 so arranged at the water inlet and outlet of chamber 4 as to allow the flow of water outside of said chamber 4 when performing maintenance operations on said chamber, without having to desactivate the pool regenerating circuit. In the device according to the invention as shown in FIG. 2, a water-inlet pipe 26 is so arranged inside chamber 4 that the end 27 thereof be located above water level 8, a turbine 28 being mounted at the end of pipe 26, above water level 8, so as to be driven by that water entering the contacting chamber and to distribute said water inside the portion 11 of chamber 4 so as to insure a first gas-water mixing. The turbine 28 drives through a shaft 29, a liquid-ring compressor 30 which feeds air to the ozonizer 3 through a filter 21 provided with a condensate water drain 22. The chamber 4 of the device shown in FIG. 2 is arranged in a water-regenerating circuit 2 in the same way as the device shown in FIG. 1.

The device 1 according to the invention as shown in FIG. 3, is to be arranged in a water-regenerating circuit 2 which is to be associated with new swimming-pools and which is partly combined with a filter. Said regenerating and disinfecting circuit with ozone comprises a side-channel pump 31 that forces the water through a filter 32, the ozonizer 3 being arranged on the water duct 33 upstream of the pump 31 sucking the ozone and forcing same through a duct 34 separate from the water duct, towards filter 32. Said filter 32 is comprised of a sealed enclosure 35 that comprises from bottom to top, a chamber 36 inside which opens a water-outlet pipe 37, a layer of filtering material 38, a chamber 39 with constant water level 40 inside which is performed the second water-ozone mixing, the first mixing being performed inside duct 33, downstream of pump 31, which is supplied by ozonizer 3, a diffuser 41 being provided below the water level 40 and being mounted at the end of that duct 34 forcing the ozone through the filter 32, the water-inlet pipe 42 opening inside the filter above water level 40. Said pipe 42 comprises at the end thereof an arrangement 43 for distributing the water to be sterilized and for insuring a maximum water-gas contact inside chamber 39 above water level 40. To maximize the gas-water exchange, it is further possible to provide as shown in FIG. 3, a duct 44 between chamber 39 and water-outlet pipe 37, said duct 44 being so arranged that the end 45 thereof opens through a filtering element 46 at water level 40 in chamber 39, the end 47 of duct 44 opening in pipe 37 and being provided with a gas diffuser 48, a valve 49 being provided on duct 44 to cut-off same.

It must be understood that the invention is not limited to the above embodiments and that many changes can be brought therein without departing from the scope of the invention as defined by the appended claims.

I claim:
1. Device for sterilizing swimming-pool water, particularly of small-volume pools, said device being provided in the water regenerating flow circuit and comprising an ozonizer, in which the ozonizer is so arranged as to supply the ozone directly into the water inside a water-ozone contacting chamber without venting the ozone to the atmosphere, the ozonizer being mounted inside the water-ozone contacting chamber, which is sealed-off and comprises an inlet and an outlet for the water to be sterilized, means being provided in said chamber for insuring the water-ozone contacting, the water-ozone contacting chamber being of the constant level type, the ozonizer being located above the water level and so arranged as to supply the ozone through a pipe and through a diffuser dipping in the water, at the bottom of the contacting chamber, the water inlet to said chamber being located above the water level in such a way that the water to be sterilized runs into that tank portion located above the water level and containing gas escaping from the water, the water outlet being located below the water level adjacent the contacting chamber bottom, and the chamber having a water-outlet pipe, the outlet of which lies at the contacting chamber bottom, which is so arranged in said contacting chamber as to extend above the chamber water level to the inlet level of the water to be sterilized, said pipe being surrounded over a portion of the length thereof lying above said water level, by two co-axial pipe sections staggered relative to one another, a first pipe section being connected to the chamber walls below the inlet for the water to be sterilized, in such a way that said water to be sterilized flows between said outlet pipe and said first pipe section, a second pipe section surrounding the first section and being staggered relative thereto in such a way that the water flow between the outlet pipe and the first pipe section causes an underpressure between both pipe sections so that the gas present inside the contacting chamber above the water level be forced between the pipe sections and contacted with the water to be sterilized as soon as it enters the contacting chamber, said water-outlet pipe comprising at the water level inside the contacting chamber, at least one opening, the said means for insuring the water ozone contacting including means provided in said pipe to cause a turbulence in the water flow at the level of said opening so as to feed therethrough in the pipe gas present above the water level inside the contacting chamber, said last-named means comprising, a baffle on said water-outlet pipe above said opening, said baffle being so arranged as to cause turbulences in the water flowing between said pipe and said first pipe section to insure a water-gas mixing and avoid water entering the water-outlet pipe through said opening.

2. Device for sterilizing swimming-pool water, particularly of small-volume pools, said device being provided in the water regenerating flow circuit and comprising an ozonizer, in which the ozonizer is so arranged as to supply the ozone directly into the water inside a water-ozone contacting chamber without venting the ozone to the atmosphere, the ozonizer being mounted inside the water-ozone contacting chamber, which is sealed-off and comprises an inlet and an outlet for the water to be sterilized, means being provided in said chamber for insuring the water-ozone contacting, the water-ozone contacting chamber being of the constant level type, the ozonizer being located above the water level and so arranged as to supply the ozone through a pipe and through a diffuser dipping in the water, at the bottom of the contacting chamber, the water inlet to said chamber being located above the water level in such a way that the water to be sterilized runs into that tank portion located above the water level and containing gas escaping from the water, the water outlet being located below the water level adjacent the contacting chamber bottom, the water inlet being so arranged inside the contacting chamber that the end thereof lies above the water level, the said means for insuring the water-ozone contacting comprising a turbine mounted adjacent the end of said inlet above the water level so as to be operated by the water entering the contacting chamber, said turbine driving through a shaft a compressor such as liquid-ring compressor supply air to the ozonizer through an air filter provided with a condensate water drain.

3. Device for sterilizing swimming-pool water, particularly of small-volume pools, said device being provided in the water regenerating flow circuit and comprising an ozonizer, in which the ozonizer is so arranged as to supply the ozone directly into the water flowing through the regeneration circuit, without venting the ozone to the atmosphere, the regenerating circuit comprising a pump such as a side-channel pump, which forces the water through a filter, the ozonizer being arranged on the water pipe upstream of the pump sucking the ozone and forcing same through a pipe separate from the water pipe towards said filter, said filter being comprised of a sealed enclosure comprising from bottom to top a chamber inside which opens a water-outlet pipe, a layer of filtering material, a constant level chamber inside which is performed the second water-ozone mixing, the first mixing occuring inside the duct upstream of the pump that the ozonizer supplies, a diffuser being provided below the water level inside the constant-level chamber, said diffuser being mounted at the end of the duct feeding the ozone to the filter, the water-inlet pipe to the filter opening inside the constant-level chamber above the water level.

4. Device as claimed in claim 3, in which a water-jet arrangement is provided at the end of the water outlet pipe to insure a maximum water-gas contact inside the constant-level chamber above the water level.

5. Device as claimed in claim 3 in which a duct is provided between the constant-level chamber and the water-outlet pipe, said duct being so arranged that the one end thereof opens at the height of the water level in said chamber, the other end opening in the pipe and being provided with a gas diffuser.

* * * * *